US011895460B2

(12) United States Patent
Ferreira et al.

(10) Patent No.: US 11,895,460 B2
(45) Date of Patent: Feb. 6, 2024

(54) ACOUSTIC HORN FOR A GENERIC LOUDSPEAKER ENCLOSURE

(71) Applicant: SAGEMCOM BROADBAND SAS, Rueil Malmaison (FR)

(72) Inventors: Arnaud Ferreira, Rueil Malmaison (FR); Dominique Susini, Rueil Malmaison (FR); Gilles Bourgoin, Rueil Malmaison (FR); Hugo Chusseau, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 245 days.

(21) Appl. No.: 17/329,904

(22) Filed: May 25, 2021

(65) Prior Publication Data

US 2021/0368260 A1 Nov. 25, 2021

(30) Foreign Application Priority Data

May 25, 2020 (FR) ....................................... 2005498

(51) Int. Cl.
*H04R 1/30* (2006.01)
*H04R 1/02* (2006.01)
(Continued)

(52) U.S. Cl.
CPC ............... *H04R 1/30* (2013.01); *H04R 1/025* (2013.01); *H04R 1/345* (2013.01); *H04R 31/006* (2013.01)

(58) Field of Classification Search
CPC . H04R 1/345; H04R 1/02; H04R 1/06; H04R 2400/11
(Continued)

(56) References Cited

U.S. PATENT DOCUMENTS 1,884,280 A 10/1932 Scheldorf
5,604,337 A 2/1997 Sugimoto et al.
(Continued)

FOREIGN PATENT DOCUMENTS

EP 0550159 A2 7/1993

OTHER PUBLICATIONS

John Murray, "The Quadratic-Throat Waveguide: A White Paper on an Invention by Charles E. Hughes of Peavey Electronics Corporation," Peavey Architectural Acoustics, Jun. 1, 2000, 16 pages.
(Continued)

*Primary Examiner* — Sean H Nguyen
(74) *Attorney, Agent, or Firm* — Muncy, Geissler, Olds & Lowe, P.C.

(57) ABSTRACT

An acoustic horn arranged to be fastened between a cabinet of a loudspeaker enclosure and an outer casing, the horn presenting a shape and/or dimensions that depend on the outer casing, the acoustic horn being arranged in such a manner that when the acoustic horn, the cabinet, and the outer casing are assembled together its inner face is in contact with the cabinet so that its inner edge surrounds a diaphragm of the loudspeaker and its outer face is in contact with the outer casing in such a manner that a hole set having at least one hole in the outer casing lies inside an area defined by its outer edge, the horn thus being arranged in such a manner that its inside peripheral surface guides sound produced by the loudspeaker towards the outside via the hole set having at least one hole in the outer casing.

14 Claims, 10 Drawing Sheets

(51) Int. Cl.
*H04R 1/34* (2006.01)
*H04R 31/00* (2006.01)

(58) Field of Classification Search
USPC .......................................................... 381/160
See application file for complete search history.

(56) References Cited

U.S. PATENT DOCUMENTS

| | | | | |
|---|---|---|---|---|
| 2013/0016864 | A1* | 1/2013 | Ivey | H04R 1/028<br>381/340 |
| 2015/0014089 | A1* | 1/2015 | Sprinkle | H04R 1/345<br>181/192 |
| 2015/0365758 | A1* | 12/2015 | Bridge | H04R 1/345<br>381/337 |
| 2020/0366978 | A1* | 11/2020 | Karnavas | H04R 1/24 |

OTHER PUBLICATIONS

Roy Minet, “Hyperbolic Horn Physics and Design,” Mar. 19, 2017, 7 pages.

* cited by examiner

ACOUSTIC HORN FOR A GENERIC LOUDSPEAKER ENCLOSURE

The invention relates to the field of loudspeaker enclosures, and in particular of enclosures containing a plurality of loudspeakers and incorporated in electronic equipment of the decoder or "set-top" box type.

BACKGROUND OF THE INVENTION

There are very many loudspeaker enclosures on the market, each incorporating a plurality of loudspeakers. By way of example, that plurality of loudspeakers may comprise a treble loudspeaker (or "tweeter"), a bass loudspeaker, also known as a low-frequency loudspeaker (or "woofer"), a middle frequency (or "mid-range") loudspeaker, etc. Playback may be active, when the loudspeaker is equipped with a motor, or else it may be passive. Certain loudspeaker enclosures are said to be "full range", since they cover all (or nearly all) audible frequencies by using these loudspeakers.

Decoder boxes are now being put on the market that incorporate both an electronic module for performing the function of a digital television the decoder, and also a plurality of loudspeakers. The decoder uses the loudspeakers to play back an audio stream. Other functions may be performed in the decoder box, for example voice recognition and voice assistant functions.

Such integration raises numerous difficulties that are not solved in the products presently available on the market. Decoder boxes are generally bulky. Certain decoder boxes incorporating loudspeakers are thus too voluminous to be placed close to a TV set. Audio playback performance is generally disappointing. The price of the decoder box is often very high.

OBJECT OF THE INVENTION

The invention sets out to reduce the cost and to improve the audio performance of equipment that incorporates a loudspeaker enclosure.

SUMMARY OF THE INVENTION

In order to achieve this object, there is provided an acoustic horn arranged to be fastened between a cabinet of a generic loudspeaker enclosure in which at least one loudspeaker is incorporated, and an outer casing suitable for covering the cabinet at least in part, the outer casing being suitable for presenting differing shapes and/or dimensions and including a hole set having at least one hole, the acoustic horn presenting a shape and/or dimensions that depend on the shape and/or the dimensions of the outer casing, the acoustic horn having an outer face, an inner face, and an inside peripheral surface defining a through cavity formed through the thickness of the horn and having an outer edge defined on the outer face and an inner edge defined on the inner face, the acoustic horn being arranged in such a manner that when the acoustic horn, the cabinet, and the outer casing are assembled together, the inner face is in contact with the cabinet in such a manner that the inner edge surrounds a diaphragm of the loudspeaker and the outer face is in contact with the outer casing in such a manner that the hole set having at least one hole in the outer casing lies inside an area defined by the outer edge, the horn thus being arranged in such a manner that the inside peripheral surface guides sound produced by the loudspeaker towards the outside via the hole set having at least one hole in the outer casing.

By means of its shape and/or its dimensions being adapted to the outer casing, the acoustic horn of invention thus serves to guide sound produced by the loudspeaker directly towards the outside, without the cabinet needing any modification in order to accommodate the shapes and/or the dimensions of different outer casings. The audio playback of the generic loudspeaker enclosure, and thus of the equipment incorporating said enclosure, is excellent regardless of the outer casing. By using one or more acoustic horns (the number depending on the number of loudspeakers), the loudspeaker enclosure can thus be used without modification in pieces of equipment that present different "getups" (in the sense of different appearances), since changes in "getup" are the result in particular of modifications to the shape and/or the dimensions of the outer casing. This characteristic of the loudspeaker enclosure being generic, and thus reusable, which is obtained by means of the acoustic horn of the invention, enables the cost of the equipment to be reduced considerably.

There is also provided an acoustic horn as described above, wherein the inner edge of the through cavity is arranged to be tangential to the circumference of the diaphragm of the loudspeaker at all points of the circumference.

There is also provided an acoustic horn as described above, wherein the through cavity flares from the inner edge towards the outer edge to guide sound towards at least one first direction.

There is also provided an acoustic horn as described above, wherein at least a first portion of the inside peripheral surface through which the first direction passes presents a shape that is hyperbolic when seen in section on a first plane that is parallel to the thickness of the acoustic horn and that includes the first direction.

There is also provided an acoustic horn as described above, wherein at least one second portion of the inside peripheral surface through which there passes a second direction that is perpendicular to the first direction presents a shape that is straight and that slopes towards the outer edge when seen in section on a second plane that is parallel to the thickness of the acoustic horn and that includes the second direction.

There is also provided an acoustic horn as described above, the acoustic horn having a shape that is symmetrical relative to a first plane that is parallel to the thickness of the horn and that includes the first direction, with the exception of fastener means for fastening it to the cabinet, which need not necessarily be symmetrical relative to said first plane.

There is also provided an acoustic horn as described above, wherein the first direction is a horizontal direction towards the front when the acoustic horn is mounted on the cabinet.

There is also provided an acoustic horn as described above, including at least one covering recess opening out in its inner face the purpose of covering the head of a first screw used to fasten only the loudspeaker to the cabinet.

There is also provided an acoustic horn as described above, including at least one fastening recess formed in the inside peripheral surface to open out in the outer face of the acoustic horn, in order to receive the head of a second screw for fastening both the acoustic horn and the loudspeaker to the cabinet.

There is also provided an acoustic horn as described above, further including at least one plug piece for plugging the fastening recess once the acoustic horn and the loudspeaker have been fastened to the cabinet.

There is also provided an acoustic horn as described above, comprising a first part and a second part that are superposed in the thickness direction of the acoustic horn, the first part being made out of rigid plastics material and being a generic part, and the second part being made out of rubber and having a shape and/or dimensions that depend on the shape and/or the dimensions of the outer casing.

There is also provided equipment comprising: a generic loudspeaker enclosure including the cabinet; the acoustic horn as described above; and also the outer casing.

There is also provided equipment as described above, the equipment being a decoder box incorporating the generic acoustic enclosure.

There is also provided an assembly method for assembling the above-described equipment, the method comprising the successive steps of:

- using at least one first screw for fastening the loudspeaker to the cabinet of the generic loudspeaker enclosure;
- positioning the horn against the cabinet in such a manner that the inside face of the horn is in contact with the cabinet and the inner edge surrounds a diaphragm of the loudspeaker;
- using at least one second screw for fastening both the acoustic horn and the loudspeaker to the cabinet.

There is also provided an assembly method as described above, the acoustic horn including at least one covering recess opening out in the inner face and at least one fastening recess formed in the inside peripheral surface to open out in the outer face, the assembly method being such that when the loudspeaker and the acoustic horn are mounted, the first screw is covered by the covering recess and the head of the second screw is positioned in the fastening recess.

There is also provided an assembly method as described above, wherein the cabinet includes a visual indicator arranged to show the location of the first screw for using first in order to fasten only the loudspeaker.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
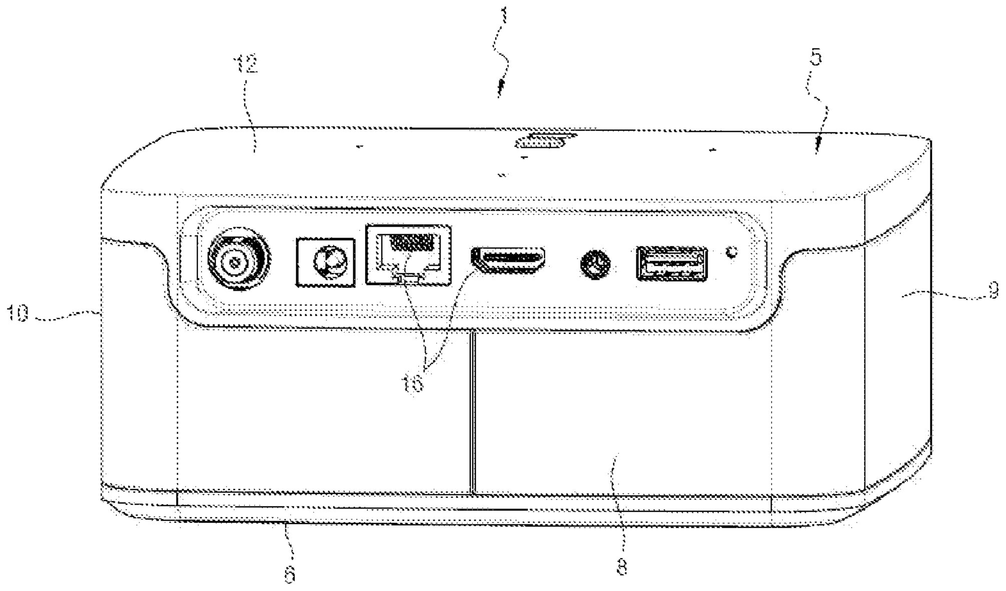
FIG. 1 is a perspective view of the back of a decoder box incorporating the loudspeaker enclosure.
Figure 2:
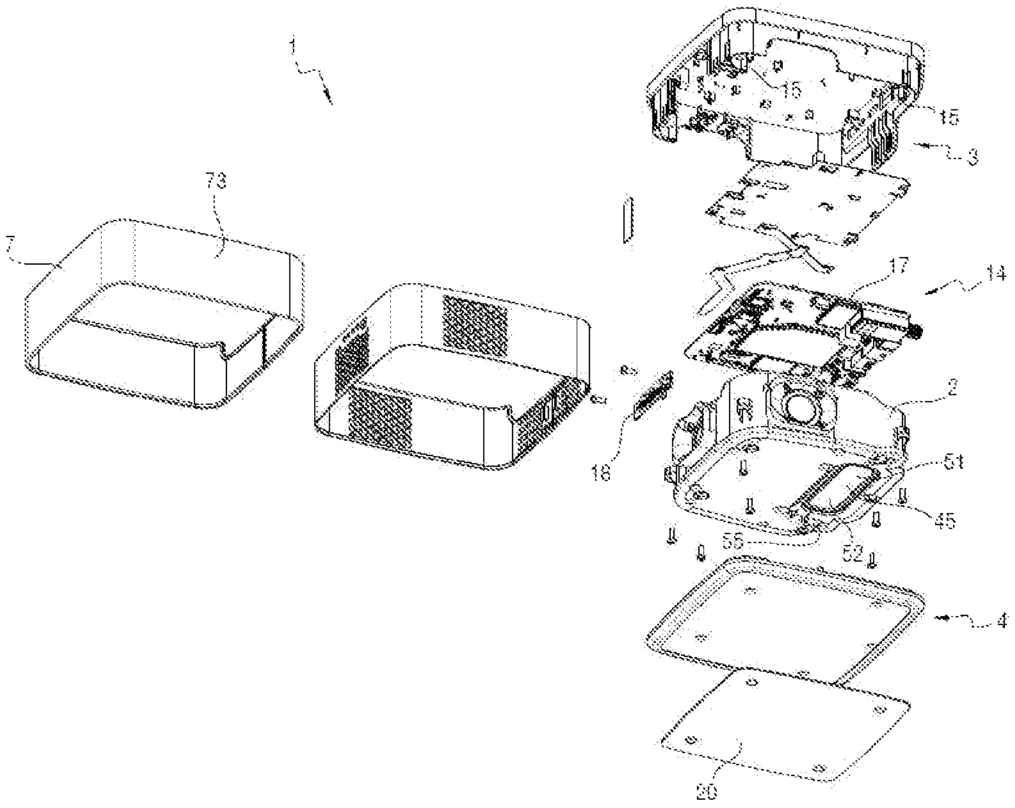
FIG. 2 is an exploded view of the decoder box.
Figure 3:
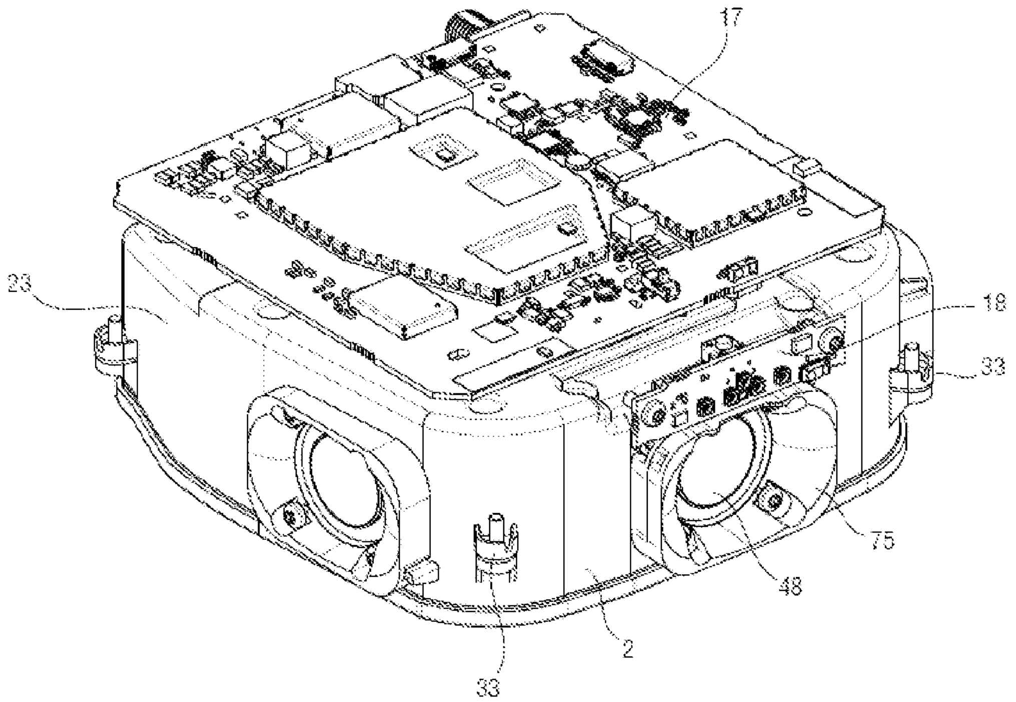
FIG. 3 is a perspective view from above of a digital TV decoder and of the loudspeaker enclosure.

With reference to FIGS. 1 to 3, the invention is implemented in modular equipment 1 that includes a generic loudspeaker enclosure 2.

The term "modular" is used to indicate that the equipment 1 comprises not only the acoustic enclosure 2, but also one or more distinct other additional modules, including at least one electronic module, which modules are incorporated with the loudspeaker enclosure 2 in order to constitute the equipment 1. It is thus possible, by using different additional modules, to obtain pieces of equipment of different types having functions and/or "getups" that are different, but all incorporating the same acoustic enclosure 2.

The term "generic" is used to mean that the loudspeaker enclosure 2 can be associated with one or more additional modules without any need to modify the loudspeaker enclosure 2, so as to obtain pieces of equipment of different types.

Specifically, in addition to the loudspeaker enclosure 2, the equipment 1 comprises a first additional module 3 and a second additional module 4.

The first additional module 3 corresponds to the top portion of the equipment 1, the second additional module 4 corresponds to the bottom portion of equipment 1, and the loudspeaker enclosure 2 is positioned between the first additional module 3 and the second additional module 4.

The general shape of equipment 1 is that of a rectangular parallelepiped with rounded corners and that presents a top face 5, a bottom face 6, and four side faces: a front face 7, a back face 8, a left face 9, and a right face 10.

The first additional module 3 comprises a top cover 12 and an electronic additional module that is a digital television decoder 14.

The top cover 12 forms the top face 5 of equipment 1. Tapped studs 15 are formed in the proximity of the corners of the top cover 12 and they extend vertically from an inside wall of the top cover 12.

The first additional module 3 further comprises electronic cards and electronic components that are mounted on the electronic cards and that perform a plurality of functions, and in particular the conventional functions of a digital television decoder: acquiring an audio/video stream, processing the stream, etc.

The electronic components also perform a voice recognition function and a voice assistant function with decoding capability. The voice assistant function makes use of the loudspeaker enclosure 2.

Naturally, some of these electronic components (microcontrollers, processes, programmable logic circuits, etc.) are capable of executing programs to enable the above-mentioned functions to be performed.

In particular, the electronic components include connectors 16 that serve specifically to connect the decoder 14 of the first additional module 3 to a TV set, to a network, to electricity mains, etc. The electronic components also include microphones for performing voice recognition, a user interface having display lights and buttons, an infrared module that enables the equipment 1 to be controlled by a remote control, etc.

The electronic card comprise both a main card 17 mounted under the top cover 12, parallel thereto and in the proximity of the inside wall of the top cover 12, and also a secondary card 18 positioned level with a top portion of the front face 7 of the equipment 1. The secondary card 18 comprises in particular electronic components for implementing the user interface.

The second additional module 4 has a support plate 20 forming the bottom face 6 of the equipment 1 and including feet on which the equipment 1 stands when it is put down.

Figure 4:
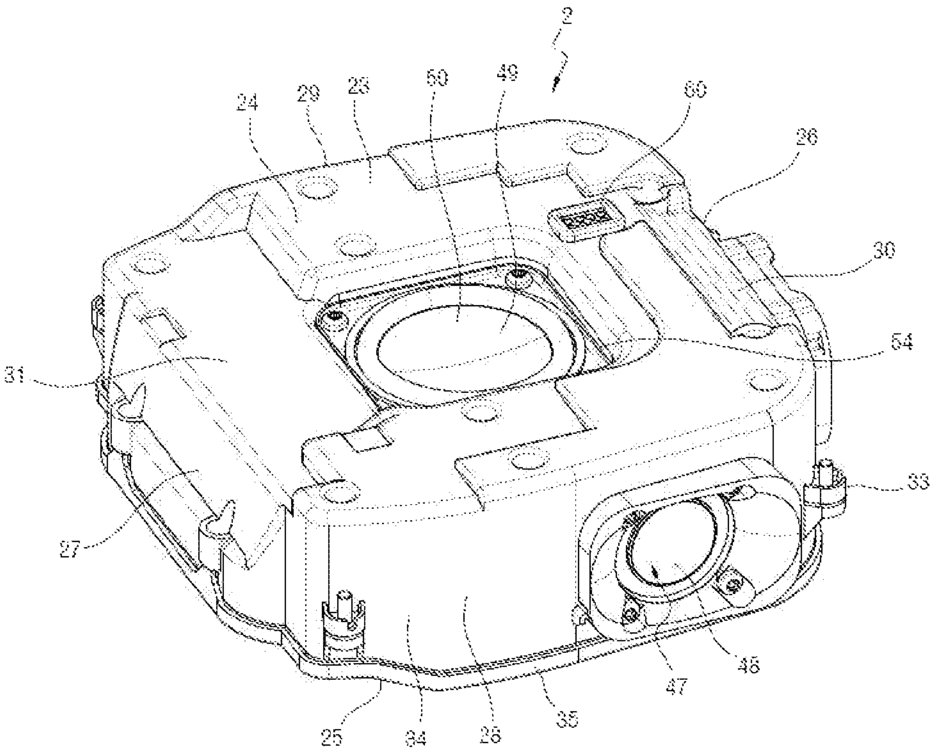
FIG. 4 is a perspective view from above of the the loudspeaker enclosure.
Figure 5:
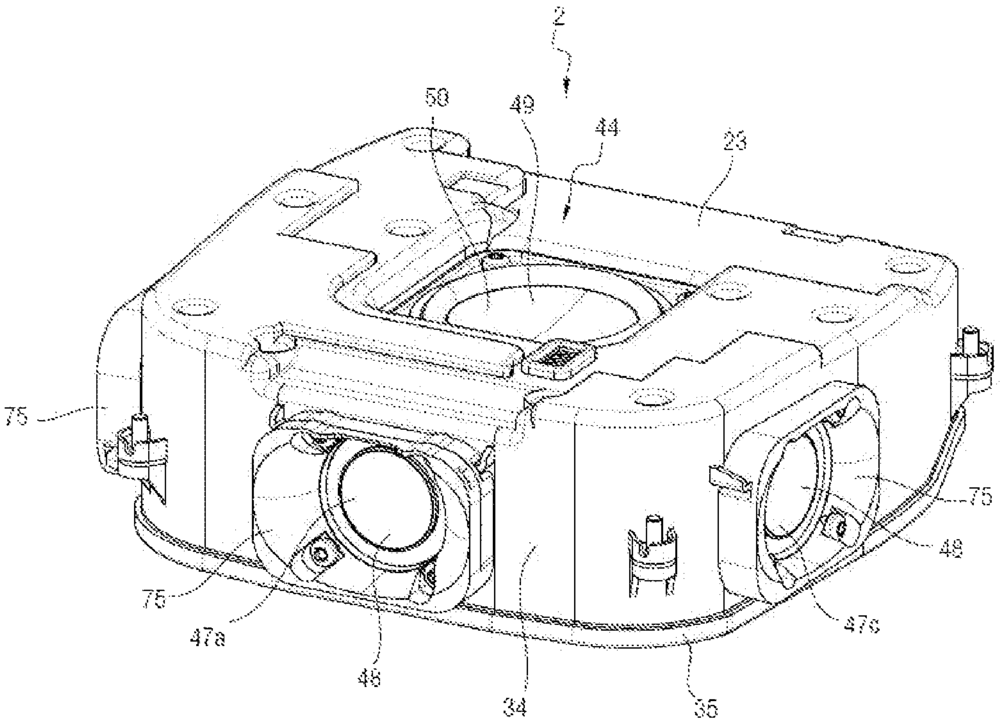
FIG. 5 is a view similar to FIG. 4, the enclosure being seen from in front and slightly from above.
Figure 6:
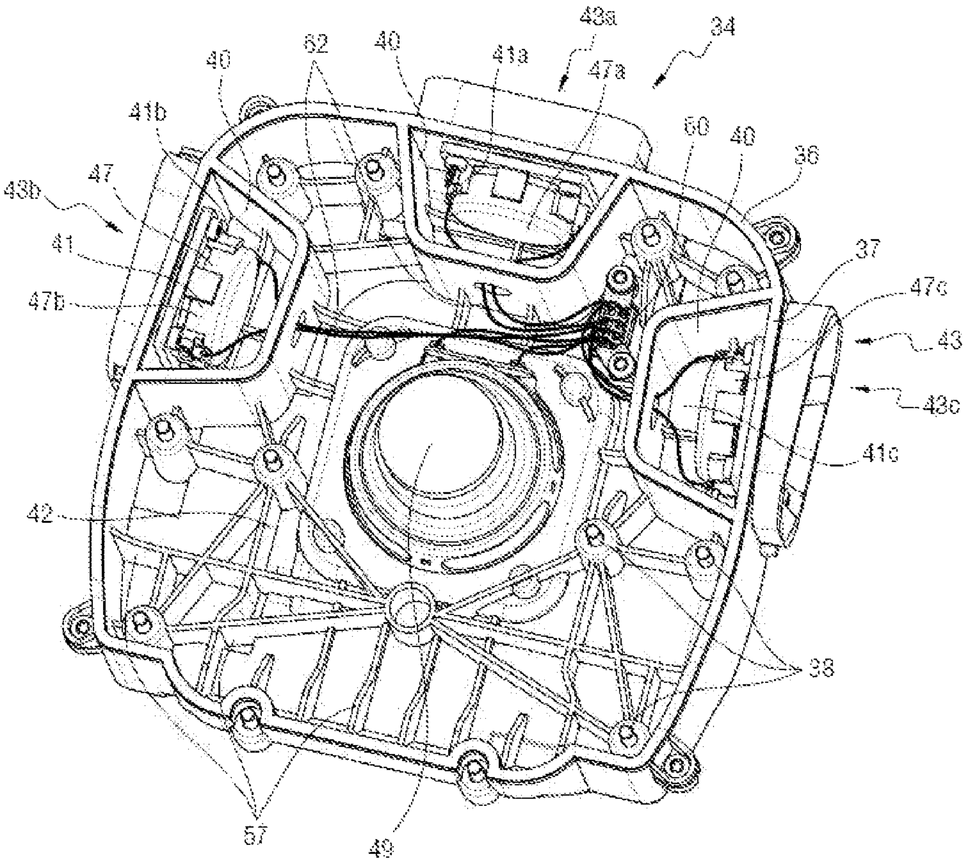
FIG. 6 is a view from beneath of a main portion of the cabinet.

With reference to FIGS. 4 to 6, the loudspeaker enclosure 2 comprises firstly a cabinet 23 that is likewise in the general shape of a parallelepiped that is a rectangular or somewhat trapezoidal, with rounded corners and presenting a top face 24, a bottom face 25, and for side faces: a front face 26, a back face 27, a left face 28, and a right face 29 (the faces corresponding to the equivalent faces of the equipment 1).

A front setback 30 is formed in the top portion of the front face 26 of the cabinet 23, in order to receive the secondary card 18. A back setback 31 is formed in the back portion of the top face 24 of the cabinet 23, in order to receive the connectors 16.

Tongues 33, each including a hole, extend horizontally from the side faces of the cabinet 23 to the proximity of the corners of the cabinet 23. When the first additional module 3 and the loudspeaker enclosure 2 are assembled together, the tapped studs 15 projecting down from the top cover 12 of the first additional module 3 are placed on the tongues 33, and screws are screwed upwards through the tongues 33 and into the tapped studs 15 in order to fasten the first additional module 3 to the loudspeaker enclosure 2.

The cabinet 23 has a main portion 34 comprising the top face 24 and the side faces of the cabinet 23, and it has a bottom cover 35 that closes the cabinet 23 and that forms the bottom face 25 of the cabinet 23. The cabinet 23 is thus open via its bottom face 25 so long as the bottom cover 35 is not in position on the main portion 34 of the cabinet 23.

The cabinet 23 includes a groove 36 that extends along the bottom surface of its side faces, and against which the bottom cover 35 is placed in order to close the cabinet 23. The groove 36 also extends along the bottom surfaces of internal partitions that are described below. Sealing is provided between the main portion 34 of the cabinet 23 and the bottom cover 35 of the cabinet 23 by a gasket 37 arranged in the groove 36.

The main portion 34 of the cabinet 23 has a plurality of tapped studs 38 that extend vertically down from the top of the main portion 35, i.e. from the inside wall of the top face 24 of the cabinet 23. Screws 39 extend through the bottom cover 35 and they are screwed into the tapped studs 38, thereby fastening the bottom cover 35 to the cabinet 23 in order to close the cabinet 23 and compress the gasket 37 so as to provide sealing between the main portion 34 of the cabinet 23 and the bottom cover 35. It should be observed that sealing between the main portion 34 of the cabinet 23 and the bottom cover 35 could be provided by other means, e.g. by assembling the main portion 34 of the cabinet 23 and the bottom cover 35 together by welding or by adhesive.

The cabinet 23 also includes internal partitions 40 that extend vertically down from the top of the main portion 34, i.e. from the inside wall of the top face 24 of the cabinet 23. The internal partitions 40 define a plurality of sealed acoustic chambers that are distinct and separated from one another by said internal partitions 40, each acoustic chamber including an orifice that opens to the outside of the cabinet in a different direction. The chambers are sealed by the internal partitions 40 and by the gasket 37 arranged in the above-mentioned groove 36.

In this example, four acoustic chambers are defined in the cabinet 23.

The four acoustic chambers comprise three first acoustic chambers 41 and one second acoustic chamber 42. Each first acoustic chamber 41 occupies a first volume. The second acoustic chamber 42 occupies a second volume that is greater than any of the first volumes. The second acoustic chamber is a central chamber, i.e. it includes a central portion of the cabinet. The second volume of the second acoustic chamber 42 corresponds to the entire internal volume of the cabinet 23 with the exception of the first volumes of the first acoustic chambers 41.

Each first acoustic chamber 41 includes a first orifice 43 that opens to the outside through a distinct side face of the cabinet 23. The three first acoustic chambers 41 comprise a front first acoustic chamber 41*a* having a front first orifice 43*a* opening to the outside through the front face 26 of the cabinet 23, a left first acoustic chamber 41*b* including a left first orifice 43*b* opening to the outside through the left face 28 of the cabinet 23, and a right first acoustic chamber 41*c* including a right first orifice 43*c* opening to the outside through the right face 29 of the cabinet 23.

The second acoustic chamber 42 includes a second orifice 44 that is positioned in the central portion of the cabinet 23, and that opens to the outside through a face that is not a side face, which may be the top face 24 or the bottom face 25 of the cabinet 23. Specifically, in this example this, referred to as a “non-side” face, is the top face 24 of the cabinet 23.

The second acoustic chamber 42 includes a third orifice 45 that opens to the outside through a face that is opposite the non-side face, i.e. in this example through the bottom face 25 of the cabinet 23. The third orifice 45 is made through the bottom cover 35 of the cabinet 23.

It can be seen that the second orifice 44 and the third orifice 45 of the second acoustic chamber 42 are offset relative to each other relative to a length or to a width of the cabinet 23, and in this example relative to a length of the cabinet 23 (where the term “length” is used to mean the dimension of the cabinet 23 between its front face 26 and its back face 27).

The preferred way of making the cabinet 23 is injection molding plastics material, which makes it possible to obtain complex shapes in inexpensive manner.

The loudspeaker enclosure 2 includes a plurality of loudspeakers each comprising a diaphragm, each loudspeaker being incorporated in a respective one of the acoustic chambers in such a manner that the diaphragm of said loudspeaker extends across an orifice of said acoustic chamber.

The enclosure thus has a plurality of first loudspeakers 47, each incorporated in a respective first acoustic chamber 41 of the cabinet 23, a second loudspeaker 48 that is incorporated in the second acoustic chamber 42, and also a third loudspeaker 49 that is also incorporated in the second acoustic chamber 42.

The first loudspeakers 47 comprise a front first loudspeaker 47*a* incorporated in the front first acoustic chamber 41*a*, and a left first loudspeaker 47*b* incorporated in the left first acoustic chamber 41*b*, and a right first loudspeaker 47*c* incorporated in the right first acoustic chamber 41*c*. The diaphragm 48 of each first loudspeaker 47 extends across the first orifice 43 of the associated first acoustic chamber 41.

The three first loudspeakers 47 are identical.

The second loudspeaker 49, having its diaphragm 50 extending across the second orifice 44 of the second acoustic chamber 42, is a bass loudspeaker 49, also referred to as a low-frequency loudspeaker, i.e. a "woofer". The third loudspeaker 51 (visible in FIG. 2) is a passive radiator 51, with its diaphragm 52 extending across the third orifice 45 of the second acoustic chamber 42.

It should be observed that the circumference of the diaphragm of each loudspeaker coincides with the edge of the orifice of the associated acoustic chamber, or at least extends in its immediate proximity. The interface between the diaphragm and the orifice is sealed, such that the acoustic chamber is completely sealed when the associated loudspeaker is in place.

In this example, the audio sources that require a smaller audio volume in order to operate, i.e. the first loudspeakers 47, are thus incorporated in the first acoustic chambers 41 and they are thereby separated from the main volume, i.e. from the second acoustic chamber 42, by the internal partitions 40 so as to create acoustic chambers that are separate. This configuration serves to avoid interference between the various channels, as could occur if the various channels were to share a common volume of air inside a single acoustic chamber. Specifically, the three first loudspeakers 47 (front, left, and right loudspeakers) are identical, and they therefore reproduce the same frequency ranges (unlike a configuration with a plurality of loudspeakers in a "conventional" enclosure that reproduce only one channel), which makes them particularly sensitive to mutual interference.

It should be observed that the positioning and the orientation of the acoustic chambers correspond to acoustic optimization for the client. Thus, the left orifice and the right orifice are directed a little towards the front (towards the user), such that these orifices are as close as possible to the outside of the equipment 1, with this applying regardless of the "getup" of the equipment 1. The front first acoustic chamber 41*a* corresponds to the central channel.

The bass occupies the remainder of the volume, i.e. the second acoustic chamber 42.

The second acoustic chamber 42 thus contains the bass loudspeaker ("woofer") 49 and the passive radiator 51. The passive radiator 51 serves to further reinforce the bass. The bass loudspeaker 49 is against the top face 24 of the cabinet 23, and the passive radiator is against the bottom face 25 of the cabinet 23. The opposite configuration, with the bass loudspeaker 49 against the bottom face 25 of the cabinet 23 and the passive radiator 51 against the top face 24 of the cabinet 23 is naturally also possible. The bass loudspeaker 49 and the passive radiator 51 are therefore in opposition, one upwards and the other downwards. This configuration makes it possible to limit the mechanical pumping effect that could result from the combined presence of the bass loudspeaker 49 and of the passive radiator 51, and thus makes it possible to limit the vibration of the equipment 1.

As mentioned above, the second orifice 44 and the third orifice 45 of the second acoustic chamber 42 are offset relative to each other along the length of the cabinet 23. The position of the passive radiator 51 is therefore not exactly in alignment with the position of the bass loudspeaker 49, i.e. they are not exactly one above the other in the cabinet 23. This offset makes it possible to limit the height of the cabinet 23, and thus of the equipment 1. Specifically, since the passive radiator 51 moves both inwards and outwards, if the passive radiator 51 and the bass loudspeaker 49 were in alignment, then extra thickness would be needed to accommodate the movement of the passive radiator 51.

Use of the passive radiator 51 is optional. If it is decided not to incorporate the passive radiator 51 in the equipment 1, then the third orifice 45 made through the bottom cover 35 of the cabinet 23 is closed. Two versions of the tool are thus used for injection molding the piece of plastics material that is to constitute the bottom cover 35: a first tool for the caver without a passive radiator 51, and a second tool for the cover with the passive radiator 51.

In this example, the second orifice 44 lies in a first setback 54 formed in an outside wall of the top face 24 of the cabinet 23. Likewise, the third orifice 45 is positioned in a second setback 55 formed in an outside wall of the bottom face 25. This enables the diaphragm 50 of the bass loudspeaker 49 and the diaphragm 52 of the passive radiator 51 to move outwards without coming into contact with portions situated above and below.

It should be observed that the first setback 54 or the second setback 55 could be defined between feet of equipment 1, with this applying to the second setback 55 in this example. Such a configuration makes it possible to obtain a "getup" in which at least one of the diaphragms of the bass loudspeaker 49 and of the passive radiator 51 is visible from the outside.

Stiffening ribs 57 are formed on an inside wall of a top face and/or of a bottom face of the cabinet, and specifically in this example on the inside wall of the top face 24 of the cabinet 23. Specifically, low-frequency vibration, produced mainly by the bass loudspeaker 49 and by the passive radiator 51, can give rise to distortion of the plastics parts making up the cabinet 23, which could result in the speaker enclosure 2 losing its sealing. The stiffener ribs 57 serve to mitigate this problem by stiffening the assembly. The stiffening ribs 57 are positioned on the basis of the results of digital simulations of the deformation of the parts as obtained by means of strength-of-materials software performing finite element calculations.

The arrangement of the loudspeakers and the way they are incorporated in the speaker enclosure 2 serves to obtain spatial audio, which, coupled with algorithms, serves to obtain audio rendering comparable with that of a system that is more complex and expensive. The loudspeaker enclosure 2 is thus compatible with the Dolby Atmos specification.

The loudspeakers of the loudspeaker enclosure 2 are electrically connected to the main card 17 of the first additional module 3 (i.e. to the digital TV decoder 14).

This electrical connection is provided as follows.

Figure 7:
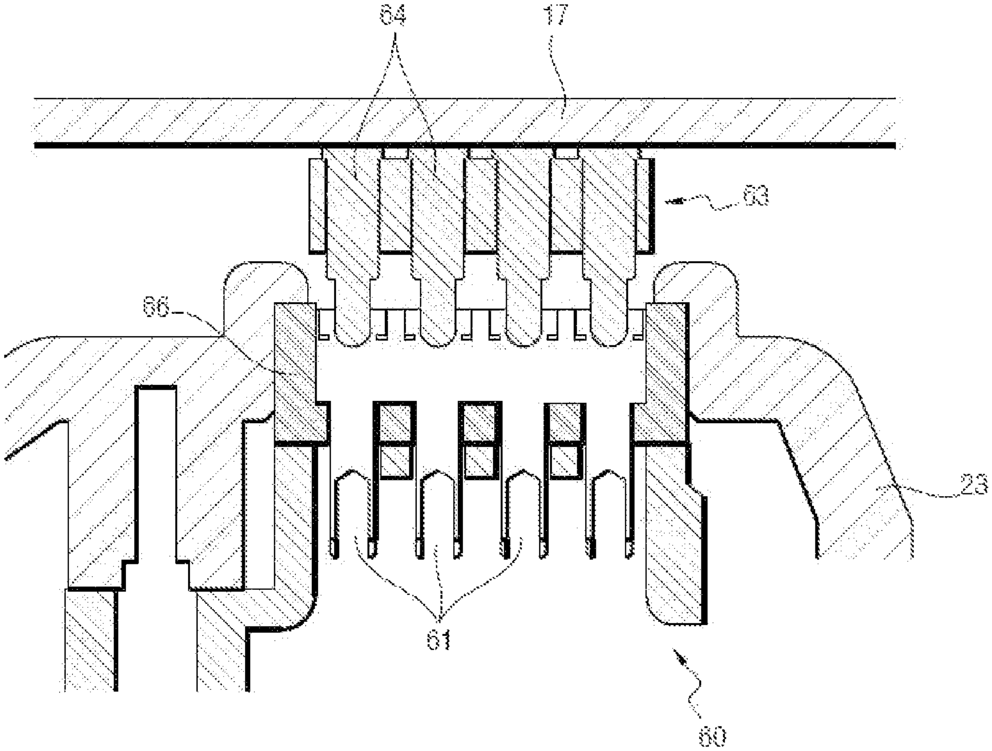
FIG. 7 shows the first and second connectors.

With reference to FIG. 7, a first connector 60 is mounted on the cabinet 23, in this example on the top face 24 of the cabinet 23. The first connector 60 is a female connector with contacts having reception pads 61 for co-operating with pogo pins. The term "pogo pin" is used to mean a pin with a spring-loaded piston.

Electric wires 62 (visible in FIG. 6), run inside the cabinet 23, connecting the loudspeakers to the first connector 60. Each of these electric wires 62 has one end connected to a loudspeaker and another end soldered to a reception pad 61 of the first connector 60.

A second connector 63 is mounted on a bottom face of the main card 17 of the decoder 14. The second connector 63 is a male connector having pogo pins 64.

When the equipment 1 is assembled, the main card 17 of the decoder 14 is mounted on the top face 24 of the cabinet 23, and the first connector 60 is connected to the second connector 63. The pogo pins 64 of the second connector 63 are thus in contact with the reception pads 61 of the first connector 60, thereby establishing electrical connections between the main card 17 of the decoder 14 and the loudspeakers.

A gasket 66 is applied all around the circumference of the first connector 60 in such a manner that the first connector 60 is mounted on the cabinet 23 in sealed manner.

This solution is very advantageous. In particular, this solution makes it possible to avoid using cables to connect the loudspeaker enclosure 2 to the decoder. Specifically, the use of cables presents several drawbacks. Mounting cables makes assembly complicated. Cables present an increased risk of sound leaking through the cable outlet(s) from the loudspeaker enclosure.

It should be observed that it would naturally possible to provide the loudspeaker enclosure with a plurality of first connectors, possibly located on different faces of the cabinet, and to do so in particular in the event of the equipment having not just one but a plurality of electronic additional modules.

Figure 8:
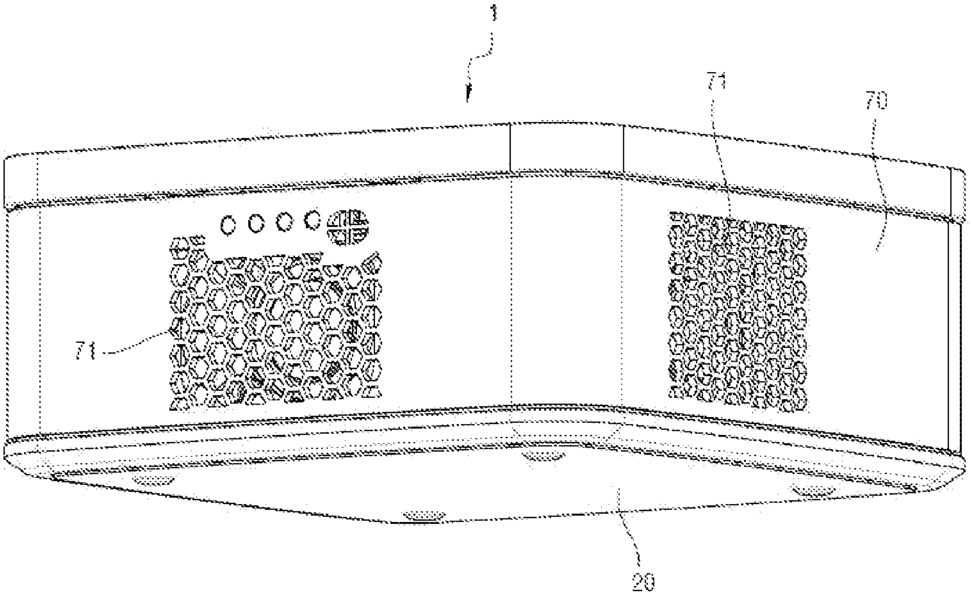
FIG. 8 is a perspective view of the decoder box, without the decorative surround.
Figure 9:
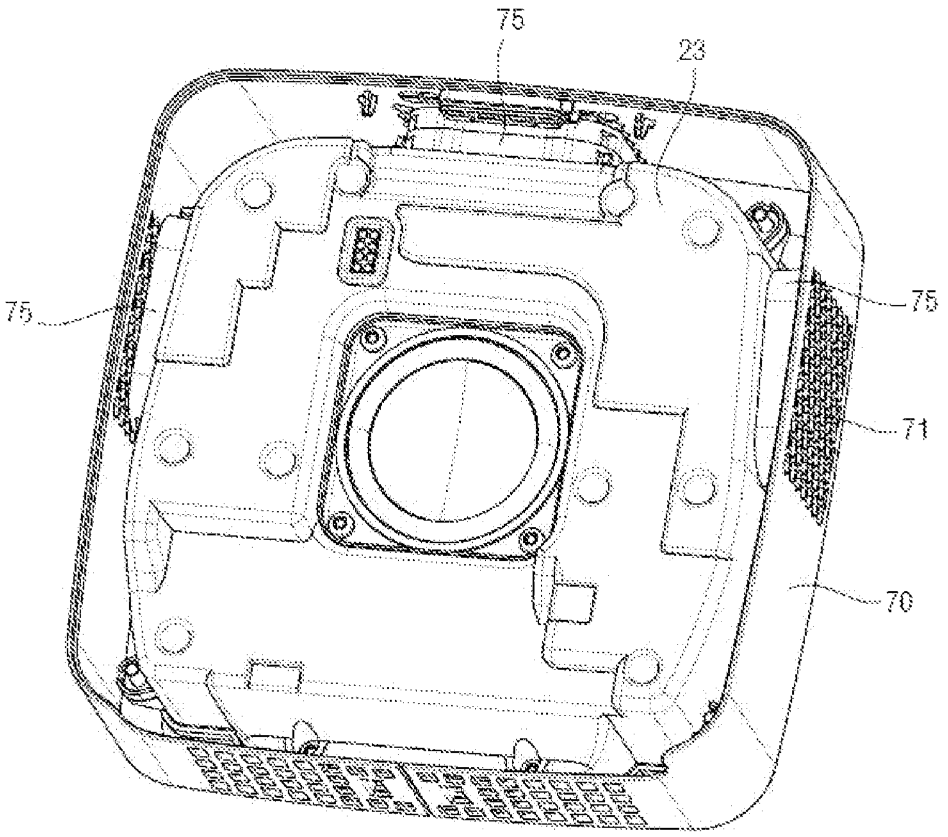
FIG. 9 is a view from above of the loudspeaker enclosure and of the outer casing.

With reference to FIGS. 8 and 9, the equipment 1 has an outer casing 70 that covers the cabinet 23, at least in part. In this example, the outer casing 70 surrounds and covers the side faces of the cabinet 23. The outer casing 70 is made out of rigid plastics material, but it could be made out of any type of material, whether rigid or not. The outer casing 70 is covered in acoustic fabric. The outer casing 70 is itself covered in a decorative surround 73 (visible in FIG. 1).

The outer casing 70 includes hole sets 71, each hole set 71 comprising one or more holes, and in this example each hole set comprises a plurality of holes. Each hole set 71 is for positioning in register with the diaphragm of a respective first loudspeaker 47 when the outer casing 70 is mounted around the side faces of the cabinet 23. The hole sets 71 serve to allow sound generated by the first loudspeakers to escape to the outside.

In this example, there is one hole set 71 in register with each first loudspeaker 47. The holes of a hole set 71 are arranged in a honeycomb array, thereby maximizing the number of holes in a hole set 71 while stiffening the outer casing 70 in the region of the hole set 71.

There is thus one hole set 71 positioned in register with the front first loudspeaker 47*a*, one hole set 71 positioned in register with the left first loudspeaker 47*b*, and one hole set 71 positioned in register with the right first loudspeaker 47*c*. The outer casing 70 also includes a hole set 71 positioned in register with the back face 27 of the cabinet 23.

The sound produced by the bass loudspeaker 49 is guided between the first additional module 3 and the cabinet 23 towards the back face 27 of the cabinet 23 and towards the hole set 71 positioned in register with the back face 27 of the cabinet 23. Likewise, the sound produced by the passive radiator 51 is guided between the second additional module 4 and the cabinet 23 towards the back face 27 of the cabinet 23 and towards the hole set 71 positioned in register with the back face 27 of the cabinet 23.

This guidance is not uniform over the entire surface of the cabinet because of the front setback 30 and the back setback 31.

Figure 10:
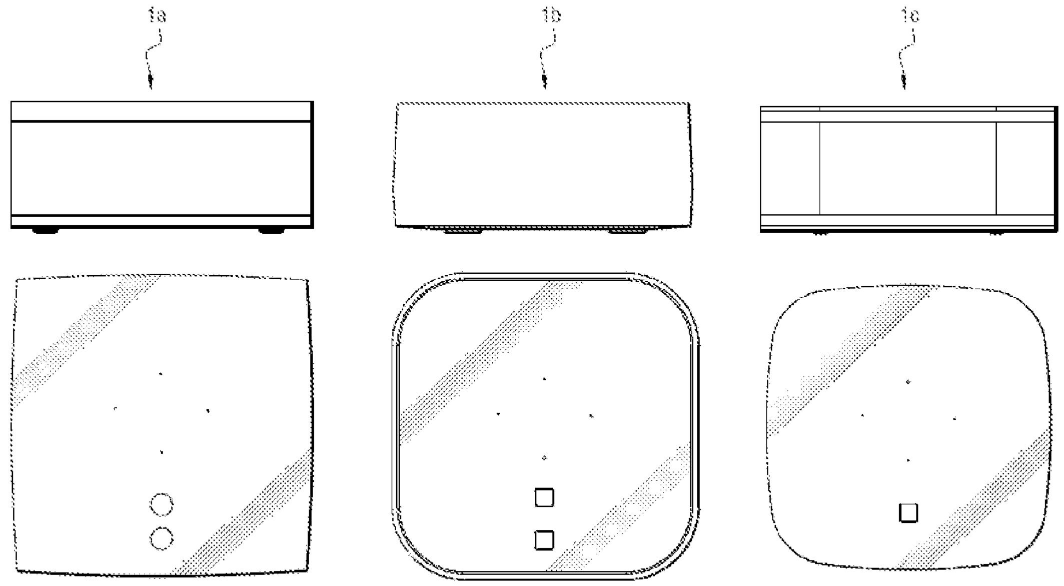
FIG. 10 shows different "getups" for the equipment.

Unlike the loudspeaker enclosure 2 and the cabinet 23, which are generic, and that can be incorporated in different pieces of equipment having different "getups", outer casings 70 may present shapes and/or dimensions that are different in order to impart a specific "getup" to a particular piece of equipment. Thus, FIG. 10 shows a plurality of pieces of equipment 1*a*, 1*b*, and 1*c*, all incorporating identical loudspeaker enclosures 2, but of outside shapes and appearances that are imparted by their respective outer casings 70, at least over the side faces of the equipment.

The loudspeaker enclosure 2, and in particular its cabinet 23, is thus of dimensions that are compatible with different shapes and dimensions for the equipment 1. The outlines of the cabinet 23 are thus designed to fit within the "getup" that is the smallest, or that possesses the greatest radii of curvature.

It is thus possible to obtain equipment 1 that is particularly compact, and that incorporates both the loudspeaker enclosure 2 with its five loudspeakers and also the decoder 14 in a total volume that is less than 200 mm×200 mm×70 mm (whereas a decoder on its own typically has thickness close to 25 mm).

Figure 11:
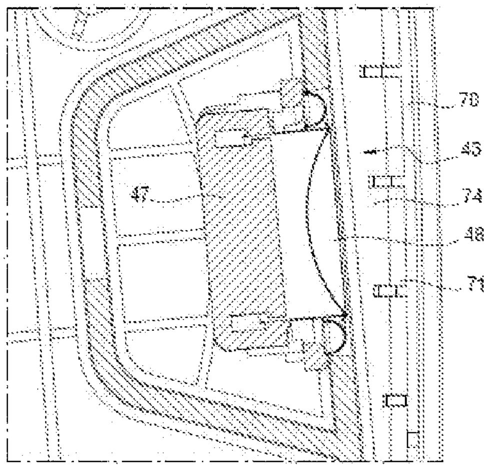
FIG. 11 is a view in section on a horizontal plane showing a first acoustic chamber and the outer casing.

With reference to FIG. 11, it is nevertheless possible, in particular when the outside dimensions of the outer casing 70 are large or else when the radius of curvature of the outer casing 70 is small, for the distances between the first orifices 43 of the first acoustic chambers 41 (and thus the diaphragms 48 of the first loudspeakers 47) and the hole sets 71 of the outer casing 70 to be relatively large. These distances give rise to cavities 74 that impair the audio performance perceived by the user, since sounds can propagate between the cabinet 23 and the outer casing 70.

Figure 12:
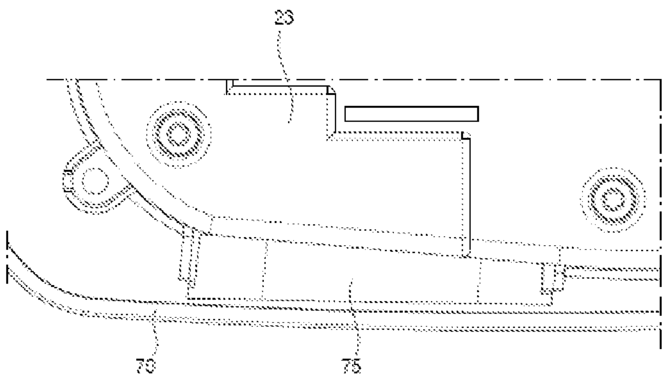
FIG. 12 is a detailed view in perspective from above of the loudspeaker enclosure, an acoustic horn, and the outer casing.

With reference to FIG. 12, these gaps are compensated by adding an optional additional part between the diaphragm 48 of each first loudspeaker 47 and the outer casing 70. These additional parts are acoustic horns 75 that serve to avoid the above-mentioned cavities and to guide sound to the outside of the equipment.

Figure 13:
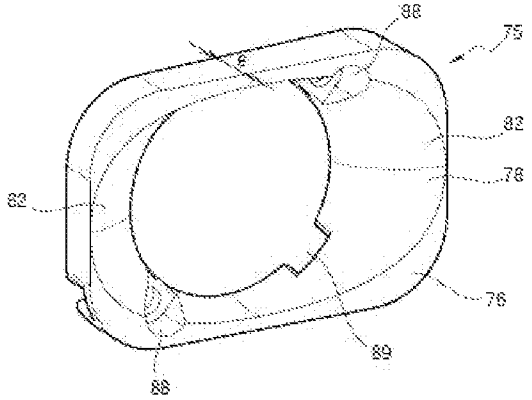
FIG. 13 is a perspective view of an acoustic horn.
Figure 14:
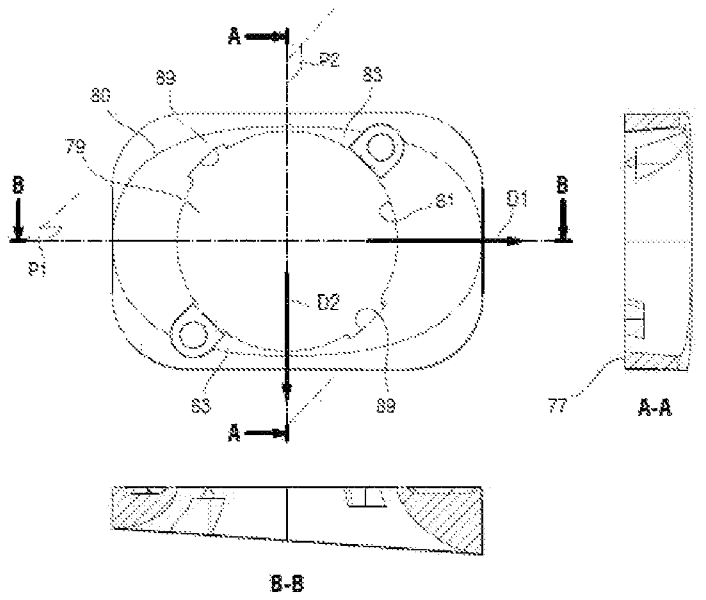
FIG. 14 comprises a plan view of the outer face of the acoustic horn together with section views on a plane P1 and on a plane P2.

With reference to FIGS. 13 and 14, each acoustic horn 75 presents a shape and/or dimensions that depend(s) on the shape and/or the dimensions of the outer casing 70. By way of example, it is the thickness e of the acoustic horn that depends on the shape and/or the dimensions of the outer casing.

There follows a description of an acoustic horn 75 that is to be mounted between the left first loudspeaker 47*b* or the right first loudspeaker 47*c* and the outer casing 70.

The acoustic horn 75 has an outer face 76, an inner face 77, and an inside peripheral surface 78 defining a through cavity 79 formed in the thickness e of the horn 75 and having an outer edge 80 defined by the outer face 76 and an inner edge 81 defined by the inner face 77. The outer edge 80 is elliptical in shape and the inner edge 81 is circular in shape.

When the acoustic horn 75 and the outer casing 70 are in place on the cabinet 23, the inner face 77 of the acoustic horn 75 is in contact with the cabinet 23 so that the inner edge 81 of the through cavity 79 surrounds the diaphragm 48 of the first loudspeaker 47. The outer face 76 of the acoustic horn 75 is in contact with the outer casing 70 in such a manner that the hole set 71 of the outer casing 70 that is positioned in register with the diaphragm 48 of the first loudspeaker 47 lies inside an area defined by the outer edge 80 of the through cavity 79. It is possible that the hole set 71 located inside the area defined by the outer edge 80 has only one hole.

The inner edge 81 of the through cavity 79 is tangential to the circumference of the diaphragm 48 of the first loudspeaker 47 at all points of its circumference.

Thus, the inside peripheral surface 78 of the acoustic horn 75 guides the sounds produced by the first loudspeaker 47 to the outside via the hole set 71 in the outer casing 70.

The through cavity 79 flares in a first direction D1 from the inner edge 81 towards the outer edge 80. The flaring of the through cavity 79 is greater in the front portion of the horn 75 than in its back portion.

The through cavity 79 is thus arranged to guide sound in at least one direction, specifically in this example in the first direction D1. In this example, the through cavity 79 is also arranged to guide the sound one way along the first direction D1.

This first direction D1 corresponds to the horizontal direction when the acoustic horn 75 is in place on the cabinet 23; sound is guided towards the front. Sound is thus guided preferentially in the horizontal direction and towards the front when the acoustic horn 75 is in place on the cabinet 23.

It should be observed that the cavity could be flared so as to guide sound both ways along a given direction, and even along a plurality of directions.

At least a first portion of the inside peripheral surface 78 through which the first direction D1 passes presents a shape that is hyperbolic when seen in section on a first plane P1 parallel to the thickness e of the acoustic horn 75 and including the first direction D1. In this example, and specifically, there are two first portions 82 of the inside peripheral surface that present this hyperbolic shape: one first portion 82 that faces forwards in the horizontal direction, and another first portion 82 that faces backwards in the horizontal direction. The shape of the first portions 82 enables sound signals to be diffused over 180°.

Likewise, at least one second portion 83 of the inside peripheral surface 78 through which there passes a second direction D2 that is perpendicular to the first direction D1 presents a shape that is straight and that slopes towards the outer edge when seen in section on a second plane P2 that is parallel to the thickness e of the acoustic horn 75 and that includes the second direction D2. In this example, and specifically, there are two second portions 83 of the inside peripheral surface 78 that present this straight and sloping shape: one second portion 83 facing upwards in the vertical direction, and another second portion 83 facing downwards in the vertical direction. The shape of the second portions 83 serves to guide sound to the hole set 71 of the outer casing 70 that is in register with the first loudspeaker 47. Each second portion 83 slopes at an angle α lying in the range 1° to 10°, and in this example equal to 5°.

It can be seen that the thickness e of the acoustic horn 75 is greater in its front portion than in its back portion. The acoustic horn 75 is thus not symmetrical about the second plane P2. Nevertheless, the acoustic horn 75 is symmetrical about the first plane P1, with the exception of means for fastening the acoustic horn 75, which in this example are not symmetrical about said first plane (although they could be).

It is thus possible to use the same acoustic horns 75 on the left and on the right of the cabinet 23, thus making it possible to use a single mold for making both the acoustic horn 75 mounted on the left and the acoustic horn 75 mounted on the right (with both identical horns 75 then guiding sound forwards in the horizontal direction). This reduces the cost of manufacturing the equipment 1.

Figure 15:
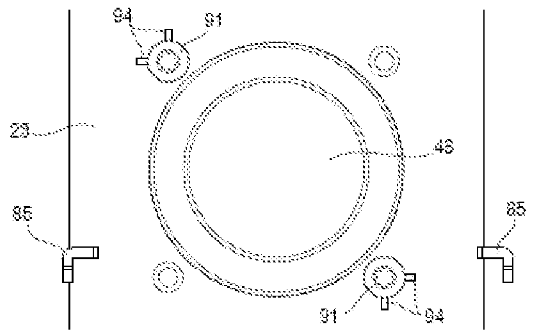
FIG. 15 shows a loudspeaker diaphragm and screws on the cabinet.
Figure 16:
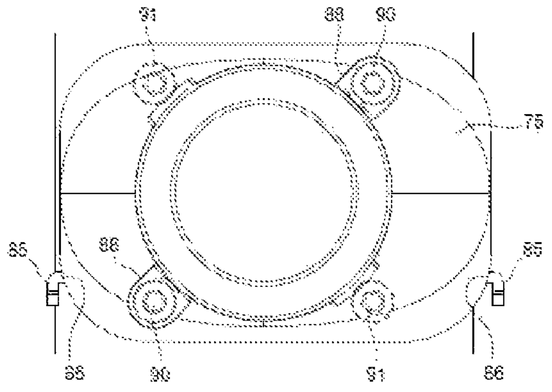
FIG. 16 is a view similar to FIG. 15, in which the horn is also shown.
Figure 17:
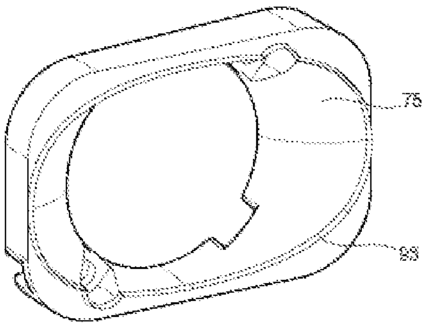
FIG. 17 is a view similar to FIG. 13, the horn including a rubber lip.
Figure 18:
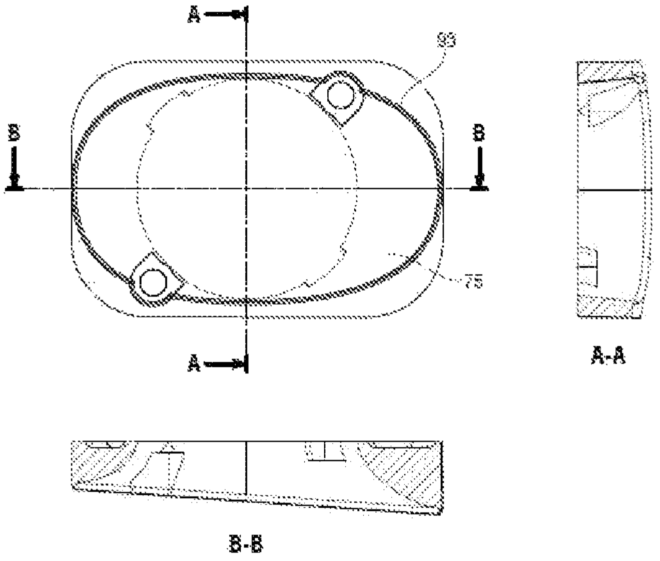
FIG. 18 is a view similar to FIG. 14, but with the horn of FIG. 17.

With reference to FIGS. 15 and 16, keying means are used to avoid assembling the left and right acoustic horns 75 the wrong way round, these means making it impossible to assemble the loudspeaker enclosure 2 together with the outer casing 70.

In this example, the keying means comprise keying ribs 85 formed on the cabinet 23, and keying recesses 86 formed in the acoustic horn 75 at its front and at its back, at two same-length corners of the horn 75.

On the left face 28 of the cabinet 23, the keying ribs 85 are in the form of rounded right angles facing each other and they are situated under the left first orifice 43*b* of the left first acoustic chamber 41*b*, on opposite sides of said left first orifice 43*b*.

On the right face 29 of the cabinet 23, the keying ribs 85 have the same shape and are situated above the right first orifice 43*c* of the right first acoustic chamber 41*c*, on opposite sides of said right first orifice 43*c*.

The keying means could present a different configuration. Nevertheless, it is advantageous for the configuration of the keying means formed of the right face 29 to match the configuration of the keying means formed on the left face 28 after rotation through 180°.

There follows a description of the means for fastening an acoustic horn to the cabinet.

The horn 75 includes at least one fastening recess 88, and specifically two fastening recesses 88, each of which is formed in its inside peripheral surface 78 so as to open out in the outer face 76 of the horn 75. When looking at the outer face of the horn 75 for engaging the outer casing, as in FIG. 14, the two fastening recesses 88 are diametrically opposite relative to the circular inner edge 81 of the through cavity 79.

The horn 75 also includes at least one covering recess 89, and specifically two covering recesses 89 opening out in the inner face 77. When looking at the inner face of the horn 75 for engaging the loudspeaker enclosure, the two covering recesses 89 are diametrically opposite relative to the inner edge 81 of the through cavity 79. The two fastening recesses 88 and the two covering recesses 89 are positioned at respective corners of a virtual rectangle (which could be a square) within which the inner edge 81 extends.

Each covering recess 89 is for covering the head of a respective first screw 91 used for fastening only the loudspeaker to the cabinet.

Each fastening recess 88 is for receiving the head of a respective second screw 90 used for fastening both the acoustic horn and the loudspeaker to the cabinet.

The first loudspeaker 47 and the horn 75 are fastened as follows. The first loudspeaker 47 is put into place on the cabinet 23. Two first screws 91 are initially used for fastening the first loudspeaker 47 to the cabinet 23. The horn 75 is then placed against the cabinet 23. The two covering recesses 89 cover the two first screws 91. Two second screws 90 are then used to fasten both the acoustic horn 75 and the first loudspeaker 47 to the cabinet 23. Each of the two second screws 90 extends in a respective one of the fastener recesses 88, each of which receives the head of the corresponding second screw 90 when the first loudspeaker 47 and the acoustic horn 75 are fastened to the cabinet 23.

The above-described fastening solution presents the following advantages. If the acoustic horn 75 were to be fastened by the same four screws as the first loudspeaker 47, then it would be difficult, after completely assembling the equipment 1, to remove the acoustic horn 75 without causing the first loudspeaker 47 to fall inside the cabinet 23. Each first loudspeaker 47 is thus fastened initially by only the two first screws 91 so as to make it possible subsequently to fasten the acoustic horn 75 by using the two remaining second screws 90. The two first screws 91 that initially hold the first loudspeaker 47 in place are buried under the acoustic horn 75 (by being positioned in the covering recesses 89). There are thus only two visible recesses in the acoustic horn 75 once it has been fastened (i.e. the fastening recesses 88), instead of four being visible if all of the screws with which the first loudspeaker 47 is fastened were used, and this makes it possible to obtain better audio performance.

Visual indicators 94, present on the cabinet 23, show the locations of the two first screws 91 for using initially.

In order to conserve a maximum guiding area for the inside peripheral surface 78, additional plug pieces may optionally be inserted in the fastening recesses 88 used for screw fastening.

Under such circumstances, it is advantageous to provide at least one guide notch in each fastening recess 88 of the acoustic horn 75 in order to assist in properly aligning the plug piece. The plug piece then includes a guide (or conversely, the notch may be in the plug piece and the guide may be on the horn 75). Since the surface of the horn 75 has different shapes at the two fastening recesses 88, two different plug pieces are provided in order to match the shapes of the horn 75. It is therefore advantageous to provide two notches/guides for each plug piece, since the notches/guides are not placed at 180° but at different angles for the two fastening recesses, thereby preventing a plug piece from being inserted in a fastening recess 88 for which it is not intended.

The acoustic horn 75 may be made out of more or less rigid plastics material.

The acoustic horn 75 may also be made out of rubber in order to optimize its audio and vibration performance. The horn 75 then includes a deformable lip 93 that serves both to provide acoustic sealing between the outlet for the first loudspeaker 47 and the surrounding medium, and also to damp any vibration of the outer casing 70.

This configuration requires specific horns to be made for each "getup" of the equipment having a different outline, in order to match the outer casing as closely as possible.

It is recommended to use a rigid material in order to contribute to the robustness of the structure of the equipment. It is thus advantageous for the horn 75 to comprise both a rigid portion, e.g. made out of rigid plastics material, and also a flexible portion at the interface with the outer casing, e.g. made out of rubber.

Provision may be made to use a rubber portion that is an additional part attached to existing rigid horns, thus making it possible to conserve the generic nature of said rigid horns.

It is also possible to make provision for using a horn made up of two distinct parts that are superposed in the thickness of the horn: a finer first part that is made out of rigid plastics material, and a thicker second part that is made out of rubber. The first part is a generic part, while the second part depends on the shape and/or the dimensions of the outer casing. The first and second parts may optionally be fastened together by the same screws, with the first part being sandwiched between the loudspeaker cabinet and the second part.

Naturally, the invention is not limited to the embodiment described, but covers any variant coming within the ambit of the invention as defined by the claims.

The invention claimed is:

1. An acoustic horn arranged to be fastened between a cabinet of a generic loudspeaker enclosure in which at least one loudspeaker is incorporated, and an outer casing suitable for covering the cabinet at least in part, the outer casing being suitable for presenting differing shapes and/or dimensions and including a hole set having at least one hole, the acoustic horn presenting a shape and/or dimensions that depend on the shape and/or the dimensions of the outer casing, the acoustic horn having an outer face, an inner face, and an inside peripheral surface defining a through cavity formed through the thickness (e) of the horn and having an outer edge defined on the outer face and an inner edge defined on the inner face, the acoustic horn being arranged in such a manner that when the acoustic horn, the cabinet, and the outer casing are assembled together, the inner face is in contact with the cabinet in such a manner that the inner edge surrounds a diaphragm of the loudspeaker and the outer face is in contact with the outer casing in such a manner that the hole set having at least one hole in the outer casing lies inside an area defined by the outer edge, the horn thus being arranged in such a manner that the inside peripheral surface guides sound produced by the loudspeaker towards the outside via the hole set having at least one hole in the outer casing, the through cavity flaring from the inner edge towards the outer edge so as to guide sound towards at least one first direction, the acoustic horn having a shape that is symmetrical relative to a first plane parallel to the thickness of the horn and including the first direction, with the exception of fastener means for fastening it to the cabinet, which need not necessarily be symmetrical relative to said first plane.

2. The acoustic horn according to claim 1, wherein the inner edge of the through cavity is arranged to be tangential to a circumference of the diaphragm of the loudspeaker at all points of the circumference.

3. The acoustic horn according to claim 1, wherein at least a first portion of the inside peripheral surface through which the first direction passes presents a shape that is hyperbolic when seen in section on a first plane that is parallel to the thickness of the acoustic horn and that includes the first direction.

4. The acoustic horn according to claim 1 wherein at least one second portion of the inside peripheral surface through which there passes a second direction that is perpendicular to the first direction presents a shape that is straight and that slopes towards the outer edge when seen in section on a second plane that is parallel to the thickness of the acoustic horn and that includes the second direction.

5. The acoustic horn according to claim 1, wherein the first direction is a horizontal direction towards the front when the acoustic horn is mounted on the cabinet.

6. The acoustic horn according to claim 1, including at least one covering recess opening out in its inner face the purpose of covering the head of a first screw used to fasten only the loudspeaker to the cabinet.

7. The acoustic horn according to claim 1, including at least one fastening recess formed in the inside peripheral surface to open out in the outer face of the acoustic horn, in order to receive the head of a second screw for fastening both the acoustic horn and the loudspeaker to the cabinet.

8. The acoustic horn according to claim 7, further including at least one plug piece for plugging the fastening recess once the acoustic horn and the loudspeaker have been fastened to the cabinet.

9. The acoustic horn according to claim 1, comprising a first part and a second part that are superposed in the thickness direction of the acoustic horn, the first part being made out of rigid plastics material and being a generic part, and the second part being made out of rubber and having a shape and/or dimensions that depend on the shape and/or the dimensions of the outer casing.

10. Equipment comprising: a generic loudspeaker enclosure including the cabinet; the acoustic horn according to claim 1; and also the outer casing.

11. An assembly method for assembling the equipment according to claim 10, the method comprising the successive steps of:

using at least one first screw for fastening the loudspeaker to the cabinet of the generic loudspeaker enclosure;

positioning the horn against the cabinet in such a manner that the inside face of the horn is in contact with the cabinet and the inner edge surrounds a diaphragm of the loudspeaker;

using at least one second screw for fastening both the acoustic horn and the loudspeaker to the cabinet.

12. The Equipment according to claim 11, the equipment being a decoder box incorporating the generic acoustic enclosure.

13. The assembly method according to claim 11, the acoustic horn including at least one covering recess opening out in the inner face and at least one fastening recess formed in the inside peripheral surface to open out in the outer face, the assembly method being such that when the loudspeaker and the acoustic horn are mounted, the first screw is covered by the covering recess and the head of the second screw is positioned in the fastening recess.

14. The assembly method according to claim 11, wherein the cabinet includes a visual indicator arranged to show the location of the first screw for using first in order to fasten only the loudspeaker.

* * * * *